Aug. 15, 1950  H. W. HEMPEL ET AL  2,518,778
POWERED STENCIL MACHINE

Filed May 27, 1946  7 Sheets-Sheet 1

INVENTORS:
HERBERT W. HEMPEL,
WALTON C. MARSH.
By Kingsland, Rogers & Ezell,
ATTORNEYS.

Aug. 15, 1950 H. W. HEMPEL ET AL 2,518,778
POWERED STENCIL MACHINE
Filed May 27, 1946 7 Sheets-Sheet 6

INVENTORS:
HERBERT W. HEMPEL,
WALTON C. MARSH,
BY Kingsland, Rogers & Ezell
ATTORNEYS.

Patented Aug. 15, 1950

2,518,778

UNITED STATES PATENT OFFICE 2,518,778

POWERED STENCIL MACHINE

Herbert W. Hempel and Walton C. Marsh, Belleville, Ill., assignors to Marsh Stencil Machine Company, Belleville, Ill., a corporation of Illinois Application May 27, 1946, Serial No. 672,478

24 Claims. (Cl. 197—6.7)

The present invention relates generally to powered cutting devices, and more particularly to an improved stencil cutting machine electrically controlled and powered by a suitable electric motor or the like. The present construction is an improvement over our stencil machine disclosed and claimed in United States Letters Patent No. 2,293,339, granted August 18, 1942.

An object of the present invention is to provide a novel powered stencil machine which is adapted to cut stencil letters accurately at a high rate of speed.

Another object is to provide a novel powered stencil machine which is adapted to speed up the production obtained by manually operated stencil machines, and in which the cutting work is accomplished as a result of button pushing, or the like, instead of manual handle action, thereby eliminating operator fatigue.

Another object is to provide a novel powered stencil machine which is constructed to block the normal stencil cutting operation in the event the dies are not properly located for stencil letter cutting.

Another object is to provide a novel powered stencil machine which is constructed to prevent repeated cutting action or repeated spacing should the power operating buttons, or the like, be held or jammed in a position closing the associated electrical contacts.

Another object is to provide a novel powered stencil machine which is constructed for one cycle operation upon the closing of a provided cycle initiation switch.

Other objects are to provide a novel powered stencil machine which is sturdily constructed and adapted to function efficiently throughout a long period of usage, which includes cushioned linkages and other operating parts to prevent damage and to reduce noise in the stencil cutting operation, which is simple in its construction, thereby facilitating manufacture, which is adapted to be operated by a user with maximum accuracy and efficiency after a minimum of instruction, and which is relatively inexpensive to produce.

The foregoing and other objects and advantages are apparent from the following description taken with the accompanying drawings, in which.

Referring to the drawings more particularly by reference numerals, 29 indicates generally a powered stencil cutting machine embodying the principles of the present invention. In the main, the frame, cutting elements, and associated elements of the stencil cutting machine disclosed herein are the same as those disclosed in our above-identified patent, but a detailed description thereof is essential for a full disclosure and understanding of the construction and operation of the improved machine. To facilitate consideration of the present description in respect to the elements which are the same as in our above-identified patent, the same reference numerals are employed herein as are used in the patent to indicate the same part or element.

Figures 7, 11, 20, 32, 33:
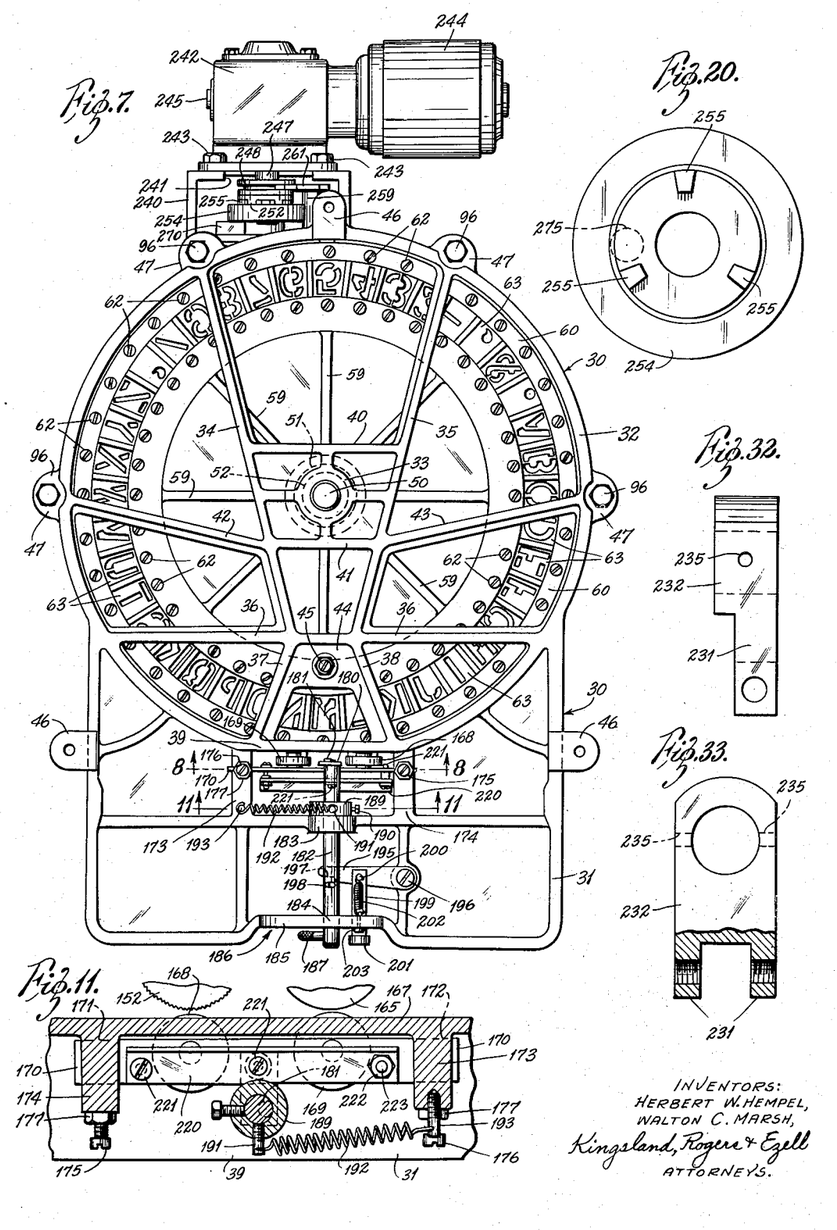
Fig. 7 is a bottom view of the machine.
Fig. 11 (Sheet 3) is a fragmentary transverse vertical sectional view on the line 11—11 of Fig. 7.
Fig. 20 (Sheet 3) is a view of the toothed face of a clutch plate.
Fig. 32 (Sheet 3) is a side elevational view of a driven link connecting the punch actuating plunger with the driven shaft.
Fig. 33 (Sheet 3) is a front elevational view of the said link, partially broken away to illustrate details.

The machine 29 includes a base or bed 30 that has a portion 31 extending out of the front thereof and a rear circular portion 32 (Fig. 7). Centrally of the circular portion there is a journal box 33 supported by beams from the outer ring 32. The beams include two, 34 and 35, the direction of which follows lines drawn from the outer ring 32 at the center of the front to two points spaced approximately 60° apart at the rear. The two beams 34 and 35 terminate at a transverse beam 36 toward the front of the mechanism; and from the junctions therewith of the beams 34 and 35 extend outwardly beams 37 and 38 that terminate at the outer ring 32. The ring is flattened at 39 across the front. At the front and rear of the journal box 33, transverse beams 40 and 41 connect the two beams 34 and 35. From the opposite junctions of the beam 41 with the beams 34 and 35 there extend the beams 42 and 43 terminating approximately diametrically opposite on the ring 32. The foregoing arrangement of beams and their shapes, as indicated, are such as to give a proper distribution of forces, since it will be realized that the punch pressure is off center and takes place within the area between the beams 36, 37, 38 and 39. The first three of the last named beams have integrally formed therewith a web 44 that has an abutment screw 45 threaded therein for a purpose to be described.

The front portion of the base is suitably webbed as will appear. About the base there are provided a number of feet 46 on which the machine rests, and a number of bosses 47 to receive hood screws to be described.

Figures 12, 13, 14, 15, 16, 17, 18, 19, 28:
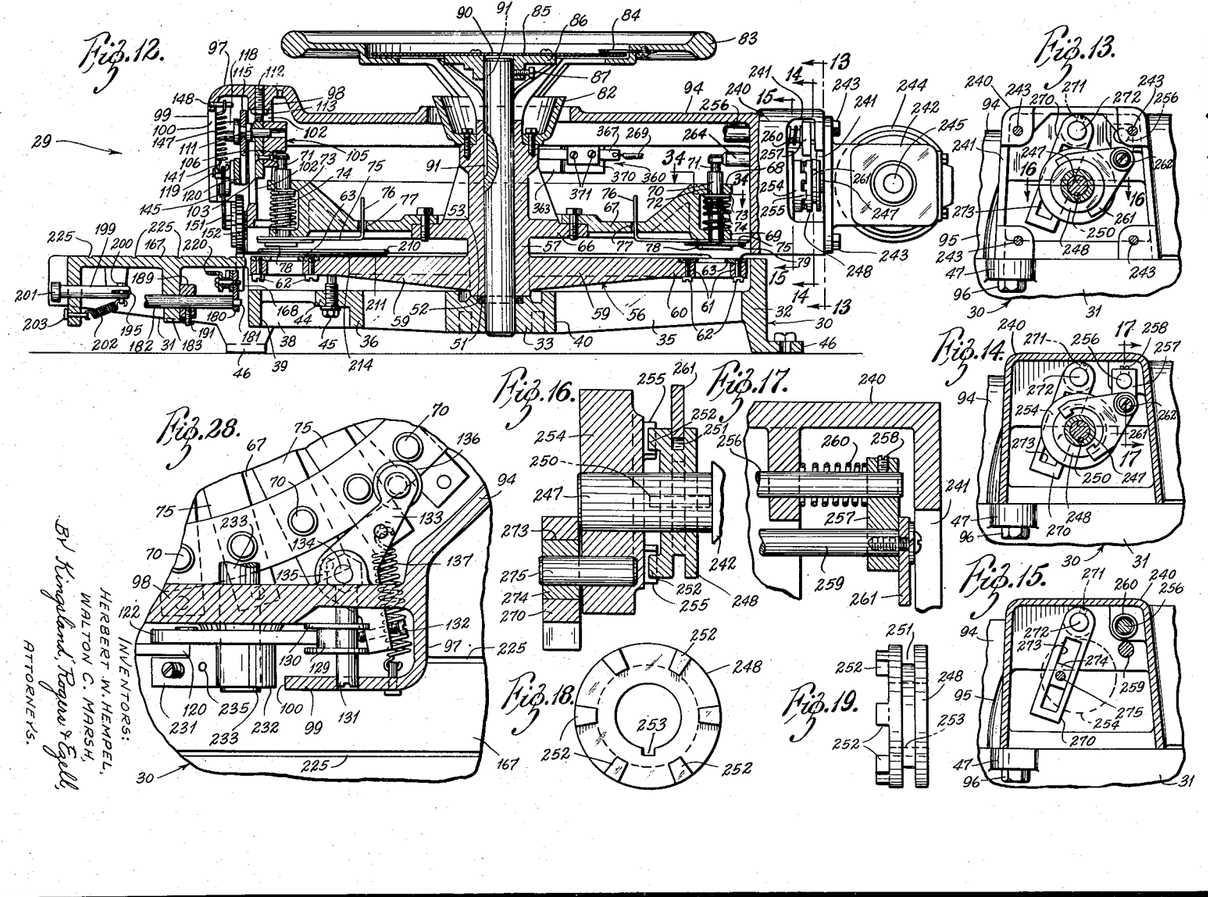
Fig. 12 (Sheet 4) is a front-to-rear vertical sectional view taken on the line 12—12 of Fig. 1.
Fig. 13 is a transverse vertical sectional view taken on the line 13—13 of Fig. 12.
Fig. 14 is a transverse vertical sectional view taken on the line 14—14 of Fig. 12.
Fig. 15 is a transverse vertical sectional view taken on the line 15—15 of Fig. 12.
Fig. 16 is a fragmentary horizontal sectional view on the line 16—16 of Fig. 13.
Fig. 17 is a fragmentary vertical sectional view on the line 17—17 of Fig. 14.
Fig. 18 is a view of the toothed face of one clutch element.
Fig. 19 is an edge view of the element shown in Fig. 18.
Fig. 28 (Sheet 4) is a fragmentary horizontal sectional view similar to a portion of Fig. 27 showing the centering mechanism in active position.

The journal box 33 is drilled to receive a central shaft 50. It also has an annular pocket 51 surrounding the shaft in which is mounted a felt oil pad 52, and surrounding the pocket 51 is an annular bearing surface 53 (Fig. 12). The center shaft 50 is pressed into the journal box 33 and is not rotatable with respect thereto.

A die carrier 56 has a long central tubular column 57 journaled on the center shaft 50, and bearing at its bottom on the annular surface 53 (Fig. 12). A plurality of radial arms 59 extend outwardly from the bottom of the center column to a die supporting ring 60 (Fig. 7). About the ring is a series of spaced screw-receiving openings 61 receiving screws 62 that hold dies 63 in place on the ring 60 at a radial distance sufficient to permit them to be brought over the punch area of the bed 30. The dies 63 are interchangeable because of the uniformity of the screw openings 61.

Emanating from the central column 57 is a table 66 to which is bolted an annular punch carrier 67, which, at its outer edge rises upwardly to provide an upper flange 68 opposite a lower flange 69, which flanges provide for the guiding of punches described below.

Punches are provided, each punch including a punch shank 70 slidably mounted in aligned openings in the flanges 68 and 69. At its upper part, each shank has a plunger-receiving neck 71, and between the two flanges an additional neck 72 to receive a spring clip 73 of the shape shown in Fig. 34. About the shank 70 there is also a coil spring 74 of the compression type acting between the flange 69 and the clip 72, urging the punch upwardly.

On each shank 70, beneath the flange 69, there is a punch-supporting plate 75 having a vertically bent tongue 76 guided within a hole 77 in the punch carrier. This latter action prevents rocking of the punch during the pressing action. A punch head 78 is mounted on a punch plate 79 secured to the plate 75.

As is evident, there is a series of punches and dies corresponding to desired letters, numbers, and the like. Each punch has its corresponding die mounted beneath it on the ring 60 and, as will be shown, any pair may be selectively located in cutting position.

Secured to the top of the column 57 there is a depending portion or hub 82 of a circular operating hand wheel 83. The operating hand wheel has an index pointer 84 attached thereto and which cooperates with a dial plate 85 mounted on a hub 86, which hub is adjustably secured as at 87 to the center shaft 50. The dial plate 85 is so arranged that when the pointer 84 is brought to any character thereon the punch and die of that character will be located in cutting position.

The dial has an oil hole 90 therein immediately above an oil groove 91 in the center shaft 50.

This groove 91 extends down to a point well below the top of the central column 57. When oil is dropped through the hole 90 and into the groove 91 it will lubricate the entire bearing and finally the surplus will descend to reach the felt pad 52 wherein it is stored to provide lubrication of the bearing 53 for an indefinite period.

Over the entire top of the machine 29 is a hood or cover 94 through which the hand wheel hub 82 passes. There are suitable bosses 95 on the side edges of the cover 94 to receive screws 96 by means of which the cover is secured to the fastening lugs 47 of the base.

On the front of the machine are the punch centering and actuating means and a paper feeding means which will now be described. The cover 94 has a housing 97 on the front thereof (Fig. 1), in which a large part of the said mechanism is mounted. The housing 97 includes a main wall 98 and a front wall 99, the latter having an opening 100 normally closed by a closure plate (not shown).

Figures 1, 8, 9, 10, 34, 35, 36:
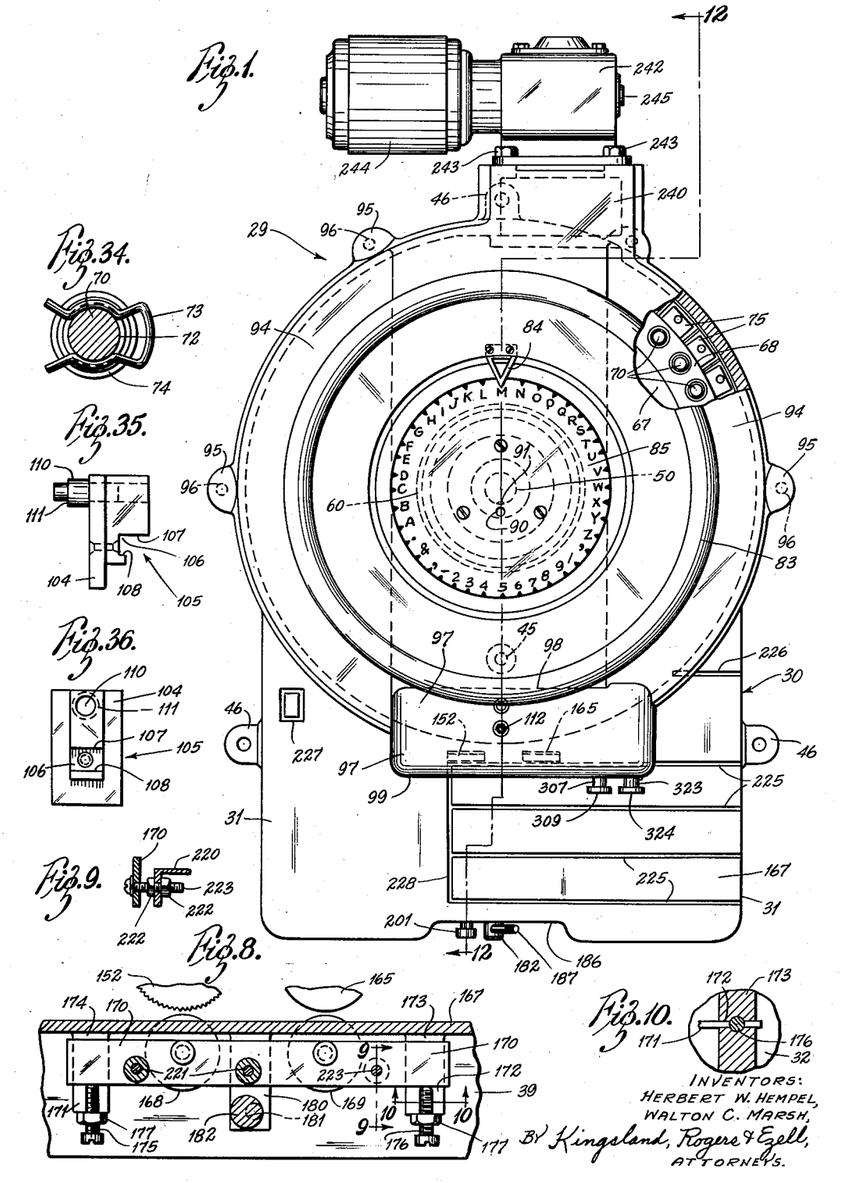
Fig. 1 is a plan view, partly broken away to disclose details, of a powered stencil machine incorporating the teachings of the present invention.
Fig. 8 (Sheet 1) is a vertical transverse view taken on the line 8—8 of Fig. 7.
Fig. 9 (Sheet 1) is a sectional view on the line 9—9 of Fig. 8.
Fig. 10 (Sheet 1) is a horizontal sectional view of the elevation adjustments for the roller supports taken on the line 10—10 of Fig. 8.
Fig. 34 (Sheet 1) is a horizontal sectional view on the line 34—34 of Fig. 12 showing a grip adjustment for one of the punch springs.
Fig. 35 (Sheet 1) is a side elevational view of the punch plunger assembly.
Fig. 36 (Sheet 1) is a rear view of said plunger assembly.
Figures 29, 31:
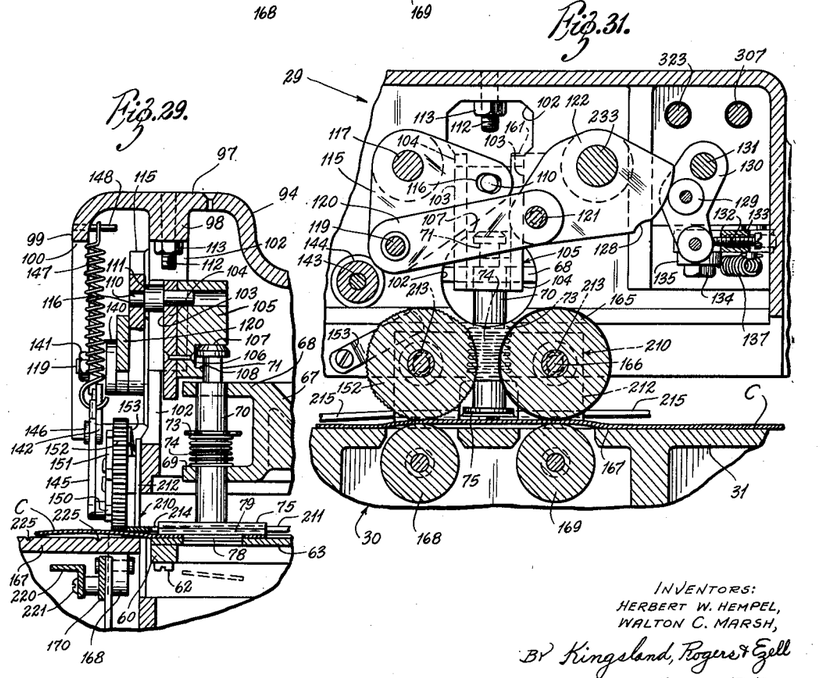
Fig. 29 (Sheet 6) is a vertical longitudinal sectional view similar to the left-hand position of Fig. 12 but with the punch enlarged.
Fig. 31 is a fragmentary transverse sectional view similar to Fig. 30 but with the mechanism in active position.
Figure 30:
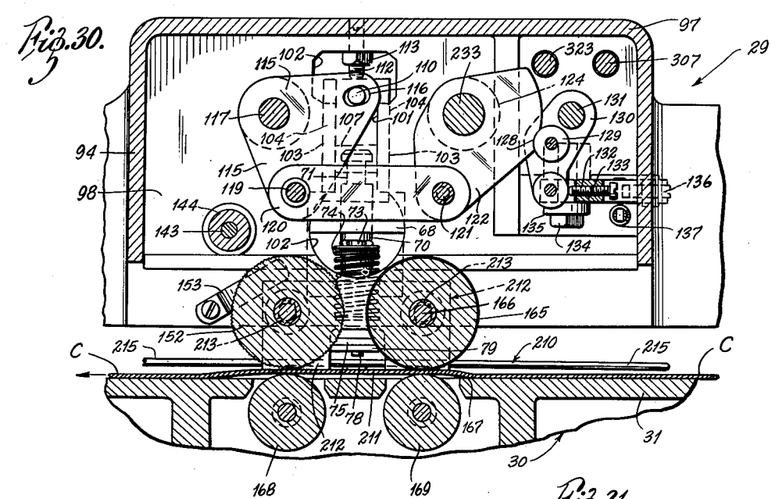
Fig. 30 is a transverse sectional view on the line 30—30 of Fig. 27 showing the punch press linkage in retracted position.

In the wall 98 there is an opening 102 shaped something like a dumbbell with enlargements at the top and the bottom joined by a narrower connection portion 101 (Fig. 30). This connecting portion 101 has opposed vertical grooves 103 in its edges that receives guides 104 on the opposite sides of a punch actuating plunger, generally indicated at 105 (Figs. 29, 35 and 36). This plunger 105 has a notch 106, somewhat wider than the vertical thickness of the heads of the punch shanks 70, providing a surface 107 for depressing the punches and an edge 108 for ensuring their withdrawal. As is evident from Fig. 12, when any punch is brought to actuating position, its head engages in the notch 106 of the plunger.

The plunger 105 has at its top a pivot pin 110 including a spacing shoulder 111, the latter being sufficient to carry the pivot to the front of the wall 98 as appears in Fig. 29. A limiting screw 112 having a lock nut 113 thereon is adjustable to determine the upper limit of movement of the plunger 105, to insure that the plunger will be in proper position to engage over the punch shank heads.

Figure 2:
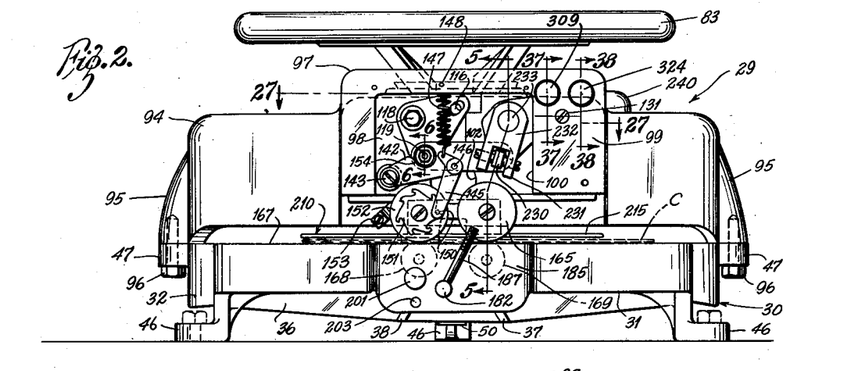
Fig. 2 is a front elevational view of the machine with the front cover plate shown in Fig. 1 removed therefrom.
Figure 3:
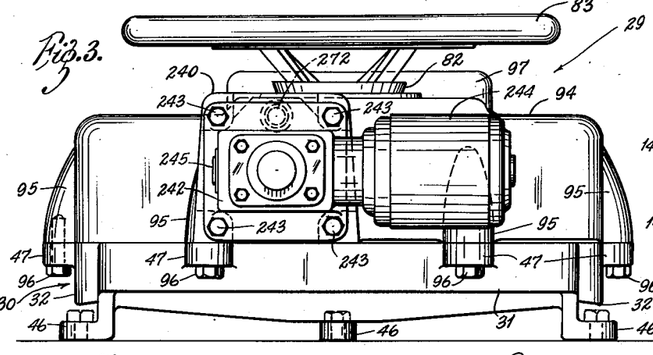
Fig. 3 is a rear elevational view of the machine.
Figure 4:
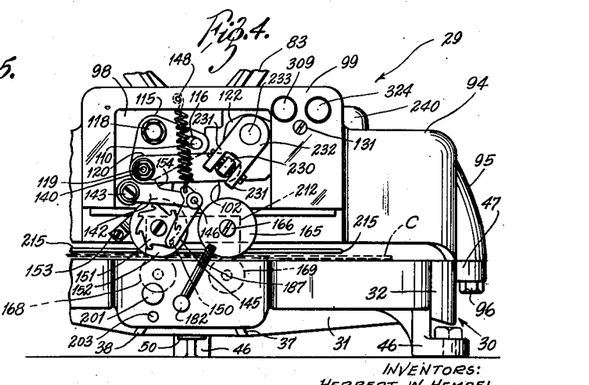
Fig. 4 is a fragmentary front elevational view of the machine similar to Fig. 2 but with the punch depressed.

A link plate 115 of the bell crank type has a slot 116 engaging over the pivot 110. The plate 115 in turn is pivotally mounted on the wall 98 on a bushing 117 held by a screw 118 (Fig. 2).

On the other angle of the link plate 115, there is pivoted at 119 a link 120, the other end of which is connected by a pivot pin 121 to a combination link and cam plate 122. The pin 121 includes an outer flattened portion 239 which is straddled by legs 231 of a bifurcated drive link 232. The link 232 is secured to a driven shaft 233 by a pin 234 (Fig. 5) extending through apertures 235 in the link 232 (Figs. 32 and 33) and through an aperture in the shaft 233.

Figures 21, 22, 23, 24, 25, 26, 27:
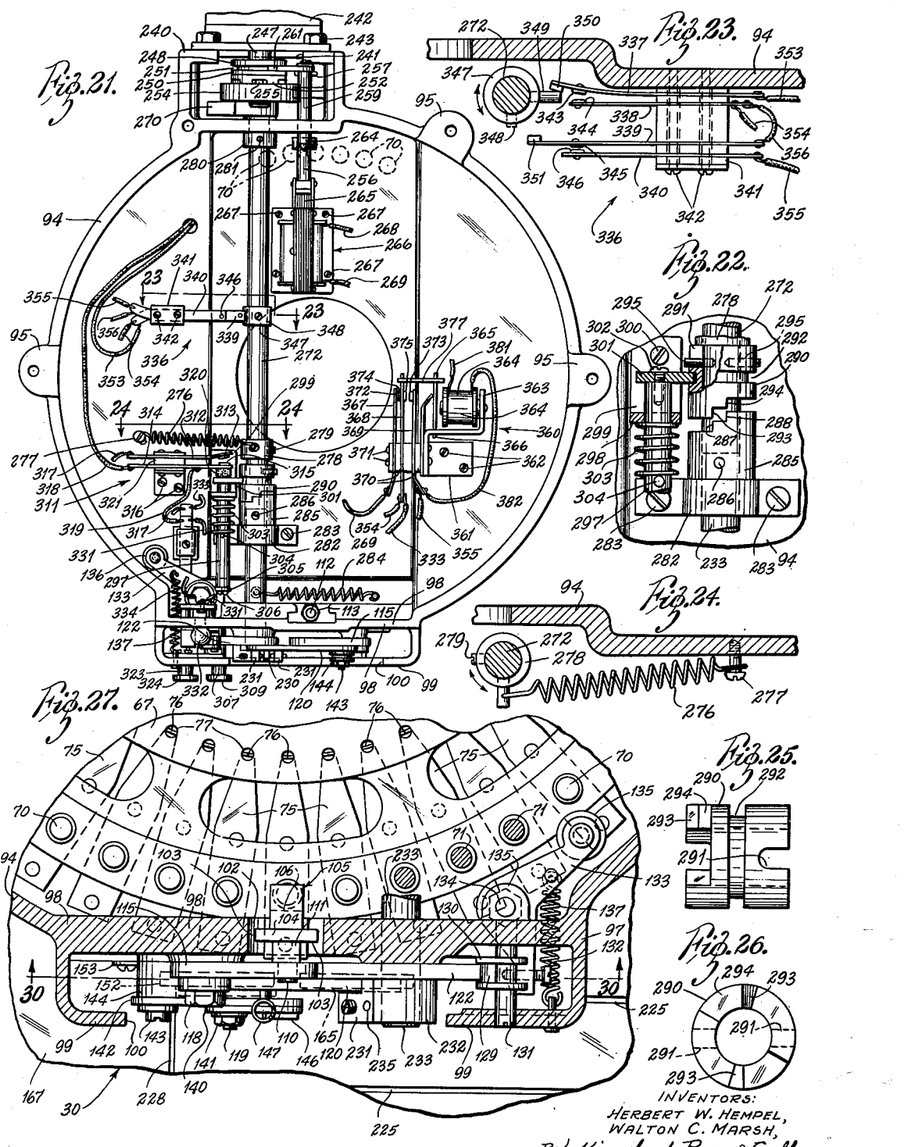
Fig. 21 (Sheet 5) is a bottom or inside view of the cover of the machine showing the location therein of the motor powered drive shaft together with associated switches and other electrical elements.
Fig. 22 is a fragmentary enlarged view of a clutch associated with the drive shaft, one element thereof being shown displaced along the drive shaft a predetermined amount in relation to the second clutch element.
Fig. 23 is a vertical sectional view on the line 23—23 of Fig. 21.
Fig. 24 is a vertical sectional view on the line 24—24 of Fig. 21.
Fig. 25 is a side elevational view of the longitudinally movable element of the spacing clutch.
Fig. 26 is a view of the tooth or step face of the element shown in Fig. 25.
Fig. 27 is a fragmentary horizontal sectional view on the line 27—27 of Fig. 2 showing the punch press mechanism and the centering mechanism both in retracted positions.

The plate 122 has a cam edge 128 engageable with a roller 129 located in the middle of a link 130 pivoted at its upper end to the end wall 98 on a screw 131 (Figs. 30, 31). The lower end of link 130 engages a screw 132 adjustably projecting from the outer end of a horizontal lever 133 pivoted at 124 to a boss 135 projecting from the back of the wall 98. The inner end of the lever 133 has a roller 136 engageable between adjacent punch shanks to center and hold immovable the punch carriage in such position that the actuated punch is in exact alignment at the cutting portion of the machine. A coil spring 137 is fastened between the inner end of the lever and the front wall 99 to maintain the centering lever normally in inactive position (Fig. 27).

Figure 6:
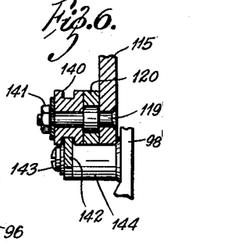
Fig. 6 is a fragmentary vertical sectional view on the line 6—6 of Fig. 2 showing the feeder cam.

It is quite evident that during the first and major part of the movement of the driven shaft 233, the punch, although moving down, is above the work and consequently is not cutting. However, as is shown below, the work feed mechanism is in operation during such interval. The work feed mechanism is operated off the pivot 119 between the link plate 115 and the link 120. Fig. 6 shows this pivot 119 in detail. On its outer end it has a roller 140 held by a nut 141, the nut engaging on a shoulder to allow free rotation of the roller. This roller 140 rides on a cam link 142 that is pivoted at 143 to the wall 98 (Fig. 2), but spaced therefrom by a spacer member 144. This cam link 142 has a bell crank 145 pivoted at 146 to its other end. A tension spring 147 acts on one end of the bell crank lever 145 and is also attached to a pin 148 (Fig. 29), extending from the wall 99. The spring 147 biases the bell crank lever 145 in a clockwise direction, viewed from the front of the machine.

The other end of the bell crank lever 145 has a ratchet dog 150 (Fig. 29) engaging with the teeth of a ratchet wheel 151 that is mounted to rotate with a serrated feed roller 152 that is attached to the lowest end of the wall 98. A light leaf spring 153 is secured to the wall 98 and bears against the back surface of the feed roller 152 to prevent its coasting.

The cam link 142 has a cam edge 154 thereon that is engaged by the roller 140. By this means when the shaft 233 rotates clockwise the link 120 moves to the left and with it the roller 140; and the latter acting upon the cam edge 154 pivots the cam lever 142 clockwise moving the bell crank lever 145 downwardly so that its dog 150, maintained in engagement with the teeth of the ratchet 151 by means of the spring 147, rotates the ratchet wheel a given angular distance clockwise, and with it rotates the feed wheel 152. This angular distance is equal to the distance between the characters.

After the cam roller 140 is moved over the hump of the cam edge 154, additional movement of the link 120 and the roller 140 about the pivot 117 produces no additional movement of the feed roll. The cam is designed so that all of the feeding takes place during the first approximately 60% of the lowering of the punch and before the actual cutting operation takes place. The action may be limited to feeding exclusive of punching, if desired, through the medium of construction described below.

Figure 5:
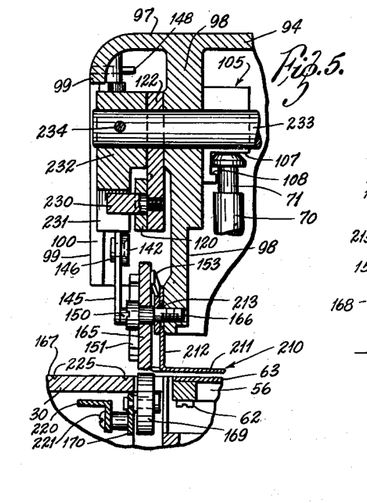
Fig. 5 is a fragmentary vertical sectional view through the punch pressing and feed mechanism of the machine taken on the line 5—5 of Fig. 2.

Spaced from the feed roll 152 is a second follower roll 165 also mounted on the lower part of the wall 98, it being secured by a screw 166 (Fig. 5).

The upper part of the front section 31 of the frame forms a table 167 upon which the work rests (Fig. 1). The hood 94 is spaced upwardly at its lower edges in the front from the die member 59 and the bed 30 so that the work may be slipped under the hood and under the punches. The two feed rolls 152 and 165 are located above the table 167 and at the rear edge thereof immediately in front of the die member 59.

There are presser rollers 168 and 169 projecting upwardly through the back part of the table 167 for cooperation respectively with the feed rolls 152 and 165. Both of the rollers 168 and 169 are mounted for rotation on a bar 170 (Figs. 8, 11) that is restrictedly floatingly mounted in slots 171 and 172 in webs 173 and 174, respectively, in the lower part of the front section 31 of the base. Screws 175 and 176 greater in diameter than the said slots are wide are threaded into adjacent walls of the slots and held by lock nuts 177 to restrict downward movement of the ends of the bar 170.

The bar 170 has a link 180 (Fig. 8) pivoted to a point slightly off center thereof, and extending downwardly therefrom. The link 180 is engaged by a pin 181 eccentrically formed on the end of a shaft 182, which shaft is journaled in a bearing 183 (Fig. 7) in a middle web of the front portion 31 of the device and a bearing 184 in a front web of wall 185 that is indented from the main part of the front wall of the machine, as shown at 186. The shaft 182 projects through the wall 185 and outside the same has an operating arm 187 located in the indentation 186 and by means of which the shaft may be rocked. It will be seen that rocking the shaft will lower the bar 170 and with it the two rolls 168 and 169.

A collar 189 is fastened adjustably about the shaft 182 by a setscrew 190 (Fig. 7). The collar 189 supports a pin 191 receiving one end of a coil tension spring 192, the other end of which is engaged in a pin 193 in the web 173. This spring 192 normally maintains the handle 187 upwardly, in which position the presser rollers 168 and 169 are urged upwardly against the feed rolls 162 and 165 so as to press the work against the last two named rollers and thereby to clamp it in position. As is evident, the tension of the spring 192 may be varied by adjusting the collar 189.

A latch is provided for holding the rolls 168 and 169 in downward or inoperative position. This latch includes a latch link 195 pivoted at 196 to a lower web of the front section 31. A notch 197 is engageable with a pin 198 on the shaft 182 when the shaft is rotated by the handle 187 to inactive position, a rotation of about 30 degrees. The pin 198 engages in the notch 197 and is thereby prevented from returning to active position.

To release the latch, there is provided a plunger 199 forked at one end over the latch 195 and pivoted thereto at 200. The plunger 199 passes through the wall 185 and has a push button 201 on the outer end thereof within the indentation 186. A coil spring 202 engages between the pivot 200 and a pin 203 in the wall 185. This spring 202 normally urges the plunger 199 and with it the latch 195 into position to be engaged by the pin 198. Hence, normaly, upon pressing down of the handle 187 to lower the presser rolls 168 and 169, the latch 195 will become effective to hold the rolls in lower position. Pressing the button 201, however, releases the latch and permits the spring 192 to return the shaft 182 and, by means of it, the presser rolls 168 and 169 to operating position.

There is also provided a work guide and stripper plate 210 (Figs. 29-31). A stripper plate portion 211 has a front part 212 turned up at right angles and having slots 213 engageable by the pivots upon which the rolls 152 and 165 are mounted on the wall 98. The slots permit vertical adjustment of the plate. The plate has a central opening 214 through which the die passes in the cutting operation. The work, however, is maintained on the bottom side of the plate 211 so that, upon withdrawal of the punch, the work is stripped therefrom. A wire guide 215 is provided to guide the work and keep it from irregularities while passing laterally through the machine.

For aligning the direction of the feed rolls, and hence the direction imparted to the work passing through the machine, the rolls 168 and 169 are mounted on the bar 170; and this bar, somewhat flexible, is attached to an angle iron 220 (Fig. 11). The connection at one end is by means of a screw 221 and a suitable spacer collar. There is a similar connection 221 at the middle. At the other end, however, there is a screw 223 threaded through the bar 170 and passing through the angle iron 220. Lock nuts 222 determine the spacing between the bar 170 and the angle iron 220 and, of course, permit a variation of the distance. Since the angle iron 220 is substantially inflexible, adjustment of the nuts 222 will, by flexing of the bar 170, vary the position of the roller 168 slightly forward or backward relative to the roller 169 and, therefore, will vary the direction of travel of the stencil through the machine.

On the top of the table 167 is provided a series of guide lines 225 and an inner guide line 226. The guide lines 225 give the proper positions for the bottom of a stencil card for cutting one or more lines of characters therein. The line 226 indicates a point to which the card must be inserted to insure that the characters will be completely contained within its borders. A line 228 determines the distance leftward to which the card must be moved to obtain proper cutting within the lateral limits thereof. There is also provided a small square index 227 indicating the size and alignment of the characters.

The foregoing description comprehends the same stencil cutting machine as is disclosed in our above-identified patent, with the exception of the shaft 233 and related parts. The following description relates to the novel features which are to be taken in combination with the previously disclosed or like machine.

The cover 94 includes a second housing 240 (Figs. 1 and 7) at the rear thereof in substantially diametrical relation to the front housing 97. A housing opening 241 is closed by a gear reducer housing 242, the latter being bolted to the housing 240 by bolts 243. Within the housing 242 is a motor speed reducer unit of any standard make, which is well known to the trade and in the art, and which, therefore, is not particularly disclosed. A motor 244 has a shaft 245 connected to the gears of the motor speed reducer within the housing 242 for reducing the speed of the motor 244 in the well-known manner. A shaft 247 is connected to the gears in the reducer housing 242 and extends into the housing 240 (Fig. 21). The shaft 247 receives a clutch disc element 248 which is secured thereto against relative rotary movement but to permit relative longitudinal movement by a spline 250 or the like (Figs. 12 through 15 and 21). The disc clutch element 248 (Figs. 18 and 19) includes a circumferential groove 251 and spaced teeth 252 on one face thereof. An axial notch 253 is provided for the reception of the spline 250. Loosely mounted on the shaft 247 is a second disc clutch element 254 (Figs. 16 and 20) of large mass which has spaced teeth 255 on one face thereof adapted to cooperate with the teeth 252 of the element 248.

Figure 39:
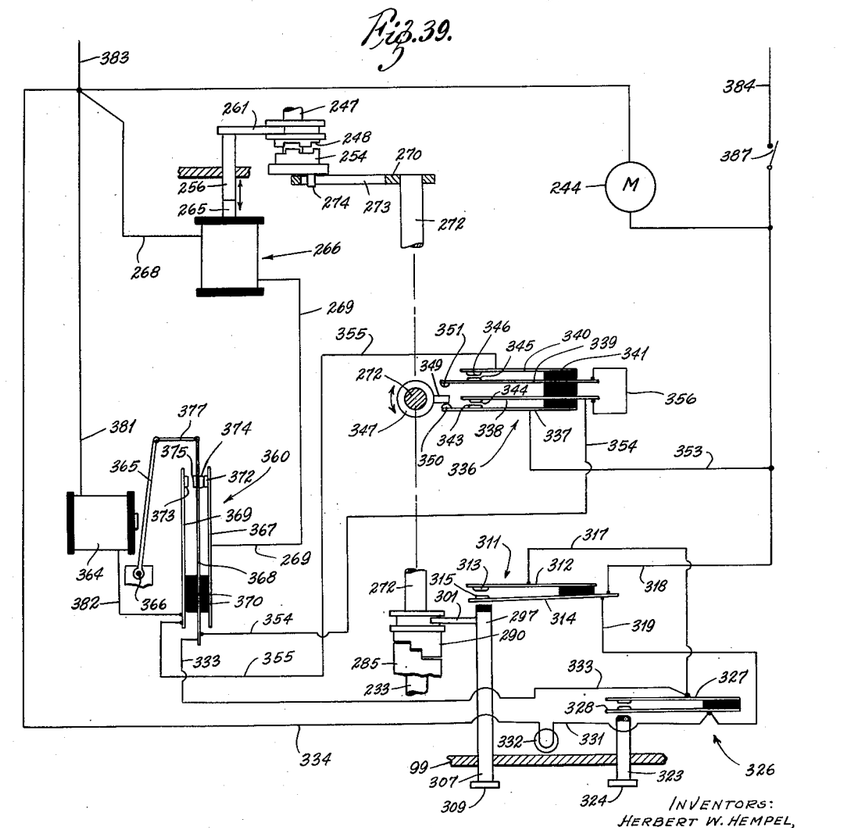
Fig. 39 is an electrical wiring diagram of the machine.

A shaft 256 extends through the wall of the cover 94 into the housing 240 and has a link member 257 secured to its housing end by a setscrew 258 or the like (Figs. 14 and 17). The link 257 supports one end of a stub shaft 259, the stub shaft 259 having sliding bearing surface in the wall of the cover 94 directly beneath the shaft 256. A compression spring 260 is disposed about the shaft 256 between the link 257 and the wall of the cover 94. A forked member 261 is secured to the end of the stub shaft 259 by a screw 262 or the like, the member 261 having inwardly directed prongs 263 which engage in the groove 251 of the clutch element 248. It is thus apparent that the spring 260 acts through the member 261 to constantly bias the clutch element 248 towards the housing 242 and out of engagement with the clutch element 254. The end of the shaft 256 disposed within the cover 94 is connected to an armature 265 of a solenoid generally indicated 266 secured by screws 267, or the like, to the inner surface of the cover 94 (Fig. 21). Electrical leads 268 and 269 connect the solenoid 266 into the electrical circuits of the machine in a manner as shown in Fig. 39 and described below. It is apparent that the solenoid 266, when energized, will move the shaft 256 and the stub shaft 259 inwardly against the force of the compression spring 260 to engage the clutch element 248 with the clutch element 254, for a purpose described below. The stub shaft 259 includes an end portion 264 which acts as a stop and which will engage the head of a punch shank 70 to prevent closing of the clutch element 248 with the clutch element 254 when the shanks 70 are not properly positioned for cutting.

A rocker arm 270 is secured by a setscrew 271, or the like, to a drive shaft 272 having bearing surface in the wall of the cover 94 at one end (Figs. 15, 16, 21). The rocker arm 270 is disposed between the clutch element 254 and the wall of the cover 94 and includes an elongated opening 273 which receives a rider member 274 having a stud 275 which pivotally engages a suitable aperture in the face of the massive portion of the clutch element 254 remote from the teeth 255 thereof. The relationship of the rocker arm 270 and the clutch element 254 is such that, in one revolution of the clutch element 254, the rocker 270 is moved approximately 45° from its rest position shown in Fig. 15 to the right and returned 45° to its position of Fig. 15. A heavy tension spring 276 inside the cover 94 maintains the shaft 272 and the rocker arm 270 in the positions shown in Fig. 15, the spring 276 being anchored at one end to a suitable screw 277 secured to the inner face of the cover 94 and at the other end to a collar 278 secured by a setscrew 279 to the shaft 272. The collar 278 serves additionally as a stop member, as is described below (Fig. 21). A collar 280 secured to the shaft 272 by a setscrew 281 prevents outward movement of the shaft 272.

The driven shaft 233 and the drive shaft 272 are mounted in the cover 94 in alignment (Fig. 21). The shaft 233 has bearing support in a bracket 282 secured by suitable bolts 283 to the inner surface of the cover 94. The shaft 233 terminates a short distance inwardly of the bracket 282 and has a sleeve 285 secured to the end thereof by a pin 286 which extends diametrically through the shaft 233 and the sleeve 285 (Fig. 22). An end of the shaft 272 rests in the sleeve 285 for bearing support. The sleeve 285 includes in its edge remote from the bracket 282 two steps 287 and 288, there being an additional set of steps 287 and 288 in diametrically opposed relation to those shown in Fig. 22. A sleeve 290 is mounted on the shaft 272 adjacent the sleeve 285 for limited longitudinal movement in respect to the shaft 272. The sleeve 290 (Figs. 25 and 26) includes diametrically opposed notches 291 in one edge, a central annular groove 292, and steps 293 and 294 in the other edge, there being two sets of steps 293 and 294 in diametrically opposed relation. The angular distance between steps 293 and 294 and steps 287 and 288 is 15° in the instant disclosure, although this distance may vary in particular machines. The notches 291 engage pins 295 secured to the shaft 272 in diametrically opposed relation. The steps 293 and 294 are arranged to engage the steps 287 and 288 of the sleeve 285 in closed relation in one extreme longitudinal position of the sleeve 290 relative to the sleeve 285, as is clear from Figs. 21 and 22. The other extreme longitudinal position of the sleeve 290 is against the collar 278 which avoids using the pins 295 as the limiting means and permits some adjustment of the sleeve 290 relative to the sleeve 285. A heavy tension spring 284 biases the shaft 233 to rest position (Fig. 21), being connected at one end to a pin fixed to the shaft 233 and anchored to the cover 94 at its other end by a screw.

Figure 37:
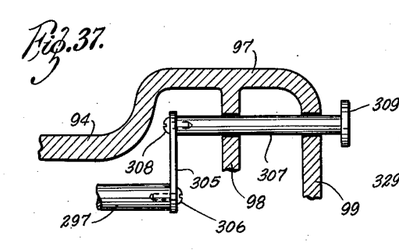
Fig. 37 (Sheet 7) is an enlarged longitudinal vertical sectional view on the line 37—37 of Fig. 2 showing the spacer operating button and associated parts.

A shaft 297 has bearing support near one end in the vertical portion 298 of a bracket 299 secured to the inner face of the cover 94 by screws 300 and has secured to its end adjacent the bracket 299 a finger 301 by a screw 302 (Figs. 21, 22). The finger 301 extends into the annular groove 292 of the sleeve 290. A compression spring 303 surrounds the shaft 297 and bears against the upright portion 298 of the bracket 299 at one end and bears at the other against a pin 304 which extends through the shaft 297. The shaft 297 is secured at its other end to a link 305 by a screw 306 (Fig. 37). The link 305 is secured at its other end to one end of a spacer plunger 307 by a screw 308, the plunger having a spacing operation button 309 at its other end. The plunger 307 has bearing support in the walls 98 and 99 of the housing 97.

A switch 311 is mounted on the inner face of the cover 94 adjacent the inner end of the shaft 297 and includes a fixed blade 312 having a contact 313 and a movable blade 314 having a contact 315, the blades 312 and 314 being mounted in opposed relation on an insulation block 321 which is secured by suitable screws 316 to the inner face of the cover 94. Leads 317 and 318 are connected to the blades 312 and 314, respectively. Lead 319 is also connected to the blade 314. A buffer 320 of insulating material is connected to the end of the blade 314 adjacent the contact 315, for engagement by the finger 301 secured to the inner end of the shaft 297.

Figure 38:
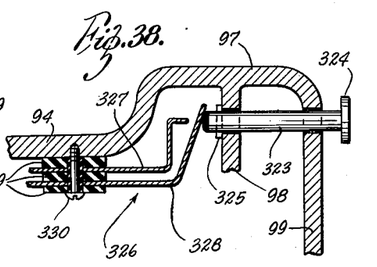
Fig. 38 is an enlarged longitudinal vertical sectional view on the line 38—38 of Fig. 2 showing the cutting operating button and associated elements.

A cutting operating plunger 323 is mounted in the walls 98 and 99 for reciprocable movement adjacent the spacing plunger 307 and has a cutting operation button 324 (Figs. 21, 38). A suitable pin 325 prevents withdrawal of the plunger 323. A switch 326 is mounted on the inner face of the cover 94 adjacent the inner end of the plunger 323 and includes switch blades 327 and 328 mounted between insulating laminations 329 which are secured to the inner face of the cover 94 by a suitable insulated screw 330. The lead 319 is connected to the switch plate 328 (Fig. 39). Another lead 331 is connected to the plate 328, and leads 317 and 333 are connected to the blade 327. The lead 331 connects at its other end to one terminal of a light 332, a lead 334 being connected to the other terminal thereof at one end.

A holding and limit switch 336 (Fig. 23) is mounted on the inner face of the cover 94 in a convenient position, as shown in Fig. 21, and includes a first pair of switch blades 337 and 338, and a second pair of switch blades 339 and 340, both pairs of blades being mounted in an insulation block 341 secured by suitable screws 342 to the cover 94. The blades 337, 338, 339 and 340 carry contacts 343, 344, 345 and 346, respectively. The free ends of the blades are disposed adjacent a collar 347 mounted on the shaft 272 and secured thereto by a setscrew 348. A pin 349 threadedly engages the collar. The pin 349 in rest position of the shaft 272 engages a member 350 of insulating material secured to the end of the blade 337 to maintain the contacts 343 and 344 in separated relation, as is shown in Fig. 23. In its position of extreme rotation, the pin 349 engages a member 351 of insulation material secured to the end of the blade 339 to close the contacts 345 and 346. A lead 353 is connected to the blade 337 and to a power line, a lead 354 is connected to the blade 338, a lead 356 connects the blades 338 and 339, and a lead 355 is connected to the blade 340. It is to be observed that the contacts 343 and 344 close due to the resiliency of the blade 337 when the pin 349 is rotated clockwise out of engagement with the member 350.

A nonrepeat relay 360 is mounted on the inner face of the cover 94 in a convenient position such as is shown in Fig. 21. The relay 360 is mounted on a bracket 361 secured to the inner face of the cover 94 by suitable screws 362. A wall 363 of the bracket 361 supports an electrical magnet 364 and its armature 365, the armature 365 having pivotal support at 366. Switch blades 367, 368 and 369 are supported adjacent the magnet 364 on insulating blocks 370 which are secured by screws 371 to the bracket 361. Adjacent the free ends, the blades 367 and 369 carry contacts 372 and 373, respectively. The blade 368 carries opposed contacts 374 and 375 which are adapted to make with the contacts 372 and 373, respectively. An insulating member 377 connects the ends of the armature 365 and the blade 368. The blade 368 is biased through its inherent resiliency to the left (Fig. 21) so that at rest its contact 374 makes engagement with the contact 372. The lead 269 connected to the solenoid 266 is connected to the blade 367 (Fig. 39). The leads 353 and 354 are connected to the blade 368, and the leads 355 and a lead 382 are connected to the blade 369. The lead 382 is connected at its other end to one terminal of the electrical magnet 364. A lead 381 connects the other terminal of the magnet 364 with one line 383 of a power source, the other line being indicated at 384 (Fig. 39). A main power switch 387 is provided.

Operation

A suitable card, in which it is desired to cut characters, is placed upon the table 167. The handle 187 is depressed withdrawing the presser rollers 168 and 169 from the rollers 156 and 155 so that the card C may be fitted to the left until its left edge at least reaches the line 228 and inwardly at least to a point where its upper edge is as far in as the line 226, and with its lower edge on a line 225. The button 201 is then pressed, unlatching the shaft 182 and permitting the presser rollers 168 and 169 to move upwardly and press the card C against the rollers 162 and 165. By rotation of the hand wheel 83, the desired character is brought beneath the index 84. The machine 29 is thereupon ready for stencil cutting.

To cut the character thus selected by the hand wheel 83, referring to Fig. 39 for the electrical circuits, the cutting operation button 324 is pushed inwardly, which closes the movable blade 328 of the switch 326 with the blade 327, thereby closing the electrical circuit through the solenoid 266, it being assumed that the main switch 387 is closed and that the motor 244 is functioning to continuously rotate the shaft 247 extending from the reducer housing 242. The armature 265 of the solenoid 266 is moved inwardly upon the solenoid 266 being thus energized, thereby moving the clutch element 248 into engagement with the clutch element 254. The clutch element 254 is rotated by the clutch element 248 until the rocker arm 270 has moved through approximately 45° which rotates the shaft 272 through approximately 45°. The pin 349 is moved thereby from its rest position shown in Fig. 39 counterclockwise 45° which permits the blade 337 due to its closing bias to close its contact 343 with the contact 344 of the blade 338 to complete a circuit around the switch 326 to the solenoid 266 to hold the solenoid 266 energized if the switch 326 is released before completing a cycle and to render the switch 326 ineffective until the pin 349 returns to open contacts 343 and 344, provided meanwhile the switch 326 has been released. At the end of its movement of 45°, the pin 349 engages the member 351 at the free end of the blade 339 to close the contact 345 thereof with the contact 346 of the blade 340. Closing of the contacts 345 and 346 completes a shunt circuit through the nonrepeat relay 360 thereby energizing the same and causing the armature 365 thereof to move the switch blade 368 counterclockwise (Fig. 39) which breaks the contacts 372 and 374 and closes the contacts 375 and 373, the former action interrupting the circuit to the clutch solenoid 266 and deenergizing the same, whereupon the spring 260 returns the clutch element 248 to its nonengaging position, the latter action completing a circuit through the nonrepeat relay 360 and the contacts 343 and 344 (and the cutting switch 326 if still held closed), preventing repeat action of the machine. The contacts 375 and 373 remain closed if the switch 326 (or the switch 311) is jammed closed or is intentionally held closed, maintaining the relay 360 energized and preventing machine repetition of a character, an important operational feature. With the switch 326 open, return of shaft 272 to rest or starting position breaks contacts 343 and 344, thereby deenergizing the relay 360. The spring 276 returns the shaft 272 through 45° to its initial starting position, and the spring 284 returns the shaft 233 through 45° to its initial starting position. The machine is thereupon ready for another cycle.

For an experienced operator, the switch blade 369 with its functions aforesaid may be cut out of the operating circuits. A simple three contact switch may be installed in the cover 94 adjacent the fixed end of blade 369 (Fig. 21). The center contact receives the lead 355, one end contact is connected to the blade 369, and the other end contact receives the lead 382. Either a pivoted link or a throw switch lever is connected to the center contact, which at the option of the machine operator is connected either to the one or the other end contact to include the switch blade 369 in its operative relation as shown or to bypass it. The blade 369 may also be bypassed by bending the contact end to a point beyond engagement range of the center blade 368.

Should it be desired to provide a space between words or between characters, the spacing button 309 is moved inwardly, which mechanically, through the plunger 307, the shaft 297 and finger 301, moves the sleeve 290 in respect to the sleeve 285 so that the normally engaging steps 293 and 287 thereof respectively are disengaged to the position shown in Fig. 22. As this position is reached, the finger 301 engages the buffer 320 on the switch blade 314 of the switch 311 to close the contact 315 thereof with the contact 313 of the switch blade 312. Closing of the contacts 315 and 313 energizes the solenoid 266 and otherwise initiates the cycle set forth above upon pushing the cutting button 324. However, in view of the fact that the step 293 of the sleeve 290 engages the step 288 of the collar 285 instead of the step 287 whereby the shaft 233 remains stationary for this predetermined degree of rotation of the shaft 272 which has been set at 15° in a preferred machine, the shaft 233 is only rotated a total of 30°. Hence, any character punch aligned for cutting is not depressed to cutting position, but the pre-spacing operation occurs and a space in the stencil line is obtained. It is to be understood, of course, that the plunger 105, the selected die punch, and the related operating linkage are operated as above set forth except for the lesser degree of movement occasioned by the 30° rotation instead of the 45° rotation of the shaft 233.

As for the stencil cutting or spacing mechanics, they are the same as for the machine of our above-mentioned patent. During approximately the first twenty percentage of the rotation of the shaft 233, the cam 122 acts quickly upon the roller 129, causing the link 130 to pivot about its center 131 and, by contact with the adjustable screw 132, move one end of the horizontal centering lever 133 which pivots about its center 134 to cause the rollers 136 on the other end to engage adjacent punch shanks, and thereby to fix the rotating punch carriers against rotation and with the proper one centered in cutting position. The extra height of the notch 106 in the punch plunger 105 permits at least a part of this centering action to take place before displacement of the punch begins.

During the next part of the movement of the shaft 233, the roller 140 operating on the cam edge 154 of the link 142 moves that link downwardly; and, through the ratchet mechanism, advances the feed roll 152 a predetermined space proper for the distance between successive characters. The roller 140 is over the hump of the cam prior to the time that the actual cutting by the punch begins.

In the foregoing, it will be seen that the toggle linkage relation is such that, during the movement so far described, a relatively small amount of movement of the shaft 233 produces a comparatively large amount of movement of the punch shank. During this time, the toggle links have been approaching a continuous line with the pivot 121 between the pivot 119 and the hub 124, increasing the leverage of the shaft 233 and reducing the amount of movement of the plate 115 and the plunger 105 for a given displacement of the shaft 233. When the punch is forced through the work, any deflection of the carrier 56 causes it to strike the screw 45 and thereby be prevented from further deflection. The rigid construction of the bed substantially prevents it from deflecting, it being designed to receive force at this point, as heretofore described.

The return movement of the shaft 233 by the spring 384 also returns the linkages to starting position. The centering mechanism is returned to starting position by its spring 137, and the bell crank ratchet arm 145 moves backward to another tooth on the ratchet wheel to be ready for the new feed.

At the end of the line, the work is moved in toward the machine to a successive line 225 and the operation is repeated. Should it be necessary to replace the work in the machine after withdrawal, location of a character of a given line over the square 227 gauges the location of that line relative to the punches.

As noted, the feed mechanism can be adjusted by the nuts 222 to insure that the work will be fed in a proper line through the machine. It will be seen by reference to Figs. 8 and 11 that the force applied by the eccentric lug 181 through the member 180 is nearer the presser roller 168 than the roller 169. As a consequence, there is more pressure applied to the feed roller 152 than to the follower roller 165. Approximately sixty percent of the total pressure is applied to the feed roller 152 and forty percent to the trailing guide roller 165. The fact that the bar 170 floats over the screws 175 and 176 insures that the pressure will be divided between the two rollers.

Feeding the stencil board on the initial rotation of the shaft 233 reduces the possibility of cutting one letter into another by error. There will always be a feed after the work is inserted before the cutting takes place. There will also be a full space, or none at all, before a cut because of the action of the centering and locking mechanism. It, therefore, cooperates with the mechanism for feeding on the initial rotation of shaft 233 to insure the full spacing.

Only a short rotation of the shaft 233 is required for the cutting which is made possible because of the great leverage of the toggle mechanism.

It is apparent from the foregoing that there has been provided a powered stencil cutting machine which fulfills all of the objects and advantages sought therefor. The machine achieves a speed of operation greatly in excess of manually operated machines. The other features thereof are obvious from the foregoing.

It is to be understood that the foregoing description and the accompanying drawings have been given by way of illustration and example. It is also to be understood that changes in form of the several elements, substitution of equivalents, and rearrangement of parts which will be obvious to those skilled in the art are contemplated as within the scope of the present invention, which is limited only by the claims which follow.

What is claimed is:

1. A stencil cutting machine comprising, in combination, a base, a plurality of character cutting means mounted thereon for movement of selected character cutting means into and out of cutting position, means for locating a selected character cutting means in cutting position, actuatable means for effecting cutting action of a selected character cutting means, means for character spacing a stencil blank, said actuatable means and said means for character spacing a stencil blank including overriding means for ineffective actuation of said actuatable means and effective actuation of said means for character spacing a stencil, a continuously running motor, and selective actuating means for optionally engaging the motor and the actuatable means rendering said overriding means selectively ineffective or effective, respectively, for cutting a character or for spacing a stencil blank by said motor.

2. A stencil cutting machine comprising, in combination, a base, a plurality of character cutting means mounted thereon for movement of selected character cutting means into and out of cutting position, means for locating a selected character cutting means in cutting position, actuatable means for effecting cutting action of a selected character cutting means, a continuously running motor, electrically actuated means energizable for mechanically connecting said motor to said actuatable means and holding them connected to cut a stencil character, means for deenergizing the electrically actuated means for breaking the mechanical connection after the cutting is accomplished, a circuit closing member operable to effect energization of the electrically actuated means, and means for maintaining operation of the deenergizing means to prevent repeat character cutting in the event said circuit closing member is jammed or otherwise held in closed position.

3. A stencil cutting machine comprising, in combination, a base, a plurality of character cutting means mounted thereon for movement of selected cutting means into and out of cutting position, means for locating a selected character cutting means in cutting position, actuatable means for effecting cutting action of a selected character cutting means, a continuously running motor, a shaft mounted for oscillation between a position of rest and a position of maximum movement, means connecting said shaft with said actuatable means for character cutting, electrically operated means for selectively connecting said shaft with said motor to rotate said shaft from rest to maximum movement position, means for returning said shaft to rest position, an electrical circuit including means for actuating said electrically operated means, means for closing said circuit, and means for breaking said circuit upon the shaft reaching maximum movement position.

4. A stencil cutting machine comprising, in combination, a base, a plurality of character cutting means mounted thereon for movement of selected cutting means into and out of cutting position, means for locating a selected character cutting means in cutting position, actuatable means for effecting cutting action of a selected character cutting means, a continuously running motor, a shaft mounted for oscillation between a position of rest and a position of maximum movement, means connecting said shaft with said actuatable means for character cutting, electrically operated means for selectively connecting said shaft with said motor to rotate said shaft from rest to maximum movement position, means for returning said shaft to rest position, an electrical circuit including means for actuating said electrically operated means, means for closing said circuit, means for breaking said circuit upon the shaft reaching maximum movement position, and means for maintaining said circuit deenergized after it is broken to prevent repeat character cutting in the event said circuit closing means is jammed or otherwise held in closed position.

5. A stencil cutting machine comprising, in combination, a base, character cutting means mounted thereon for movement into and out of cutting position, means for locating a selected character cutting means in cutting position, actuatable means for effecting cutting action of a selected character cutting means, a continuously running motor, means for actuating said actuatable means by said motor, and means for preventing said last-named means from functioning in the event the selected character cutting means is not operatively located including a member connected to said actuating means and engageable with a character cutting means to block effective functioning of said actuating means when the character cutting means are not operatively located.

6. A stencil cutting machine comprising, in combination, a base, character cutting means mounted thereon for movement into and out of cutting position, means for locating a selected character cutting means in cutting position, actuatable means for effecting cutting action of a selected character cutting means, a continuously running motor, means for actuating said actuatable means by said motor, including an electrical circuit and a mechanical device electrically moved thereby, means for closing said circuit, and means for preventing effective movement of said mechanical device upon closing of said circuit in the event the selected character cutting means is not operatively located.

7. A stencil cutting machine comprising, in combination, a base, character cutting means mounted thereon for movement into and out of cutting position, means for locating a selected character cutting means in cutting position, actuatable means for effecting cutting action of a selected character cutting means, a continuously running motor, means including a solenoid for actuating said actuatable means by said motor, electrical circuits for the solenoid, means for closing one circuit through said solenoid to actuate said solenoid, and means for closing another circuit through said solenoid adapted to hold said solenoid energized, said last-named means being operative after said first-named circuit closing means is actuated and being adapted to maintain said solenoid energized upon release of said first closing means.

8. A stencil cutting machine comprising, in combination, a base, character cutting means mounted thereon for movement into and out of cutting position, means for locating a selected character cutting means in cutting position, actuatable means for effecting cutting action of a selected character cutting means, a continuously running motor, means including a solenoid for actuating said actuatable means by said motor, electrical circuits for the solenoid, means for closing one circuit through said solenoid to actuate said solenoid, means for closing another circuit through said solenoid adapted to hold said solenoid energized, said last-named means being operative after said first-named circuit closing means is actuated and being adapted to maintain said solenoid energized upon release of said first closing means, a relay, and means for energizing said relay to interrupt the circuits through said solenoid at a predetermined point in the character cutting cycle.

9. A stencil cutting machine comprising, in combination, a base, character cutting means mounted thereon for movement into and out of cutting position, means for locating a selected character cutting means in cutting position, actuatable means for effecting cutting action of a selected character cutting means, a continuously running motor, means including a solenoid for actuating said actuatable means by said motor, electrical circuits for the solenoid, means for closing one circuit through said solenoid to actuate said solenoid, means for closing another circuit through said solenoid adapted to hold said solenoid energized, said last-named means being operative after said first-named circuit closing means is actuated and being adapted to maintain said solenoid energized upon release of said first closing means, a relay, means for energizing said relay to interrupt the circuits through said solenoid at a predetermined point in the character cutting cycle, and means for maintaining said relay energized at least until the character cutting cycle is completed.

10. A stencil cutting machine comprising, in combination, a base, character cutting means mounted thereon for movement into and out of cutting position, means for locating a selected character cutting means in cutting position, actuatable means for effecting cutting action of a selected character cutting means, a continuously running motor, means including a solenoid for actuating said actuatable means by said motor, electrical circuits for the solenoid, means for closing one circuit through said solenoid to actuate said solenoid, means for closing another circuit through said solenoid adapted to hold said solenoid energized, said last-named means being operative after said first-named circuit closing means is actuated and being adapted to maintain said solenoid energized upon release of said first closing means, a relay, means for energizing said relay to interrupt the circuits through said solenoid at a predetermined point in the character cutting cycle, means for maintaining said relay energized at least until the character cutting cycle is completed, and means for maintaining said relay energized and said solenoid circuits broken thereby after completion of the character cutting cycle until said means for closing one circuit is released whereby character cutting recycling is prevented in the event said means for closing said one circuit is jammed closed or is held closed.

11. In combination, a stencil cutting machine comprising character cutting means, an electric motor, mechanical means operatively associated with said character cutting means and said electric motor for actuating the former by the latter including a clutch and means normally urging its elements continuously out of engagement, and electrically energizable means for engaging said clutch elements and maintaining them engaged, for effecting the character cutting phase of a character cutting cycle.

12. In combination, a stencil cutting machine comprising character cutting means, an electric motor, mechanical means operatively associated with said character cutting means and said electric motor for actuating the former by the latter including a clutch and means normally urging its elements continuously out of engagement, electrically energizable means for engaging said clutch elements and maintaining them engaged, for effecting the character cutting phase of a character cutting cycle, and mechanical means for effecting the return to rest phase of a character cutting cycle.

13. In combination, a stencil cutting machine comprising character cutting means, an electric motor, mechanical means operatively associated with said character cutting means and said electric motor for actuating the former by the latter including a clutch and means normally urging its elements continuously out of engagement, electrically energizable means for engaging said clutch elements and maintaining them engaged for effecting the character cutting phase of a character cutting cycle, mechanical means for effecting the return to rest phase of a character cutting cycle, normally inactive mechanical means superposed on said first mentioned mechanical means for changing said character cutting cycle to a character spacing cycle without modification of the electrically energizable means, and means for simultaneously rendering both mechanical means active.

14. In combination, a stencil cutting machine comprising character cutting means, an electric motor, mechanical means operatively associated with said character cutting means and said electric motor for actuating the former by the latter including a clutch normally disposed with its elements out of engagement, electrically energized means for engaging said clutch elements and for effecting the character cutting phase of a character cutting cycle, including electrical circuits, a solenoid in said circuits, means for closing one circuit through the solenoid to actuate said solenoid, and means for closing another circuit through said solenoid adapted to hold said solenoid energized, said last-named means being operative after said first-named circuit closing means is actuated and being adapted to maintain said solenoid energized upon release of said first closing means.

15. In combination, a stencil cutting machine comprising character cutting means, an electric motor, mechanical means operatively associated with said character cutting means and said electric motor for actuating the former by the latter including a clutch normally disposed with its elements out of engagement, electrically energized means for engaging said clutch elements, and for effecting the character cutting phase of a character cutting cycle, including electrical circuits, a solenoid in said circuits, means for closing one circuit through the solenoid to actuate said solenoid, means for closing another circuit through said solenoid adapted to hold said solenoid energized, said last-named means being operative after first-named circuit closing means is actuated and being adapted to maintain said solenoid energized upon release of said first closing means, a relay, and means for energizing said relay to interrupt the circuits through said solenoid at a predetermined point in the character cutting cycle.

16. In combination, a stencil cutting machine comprising character cutting means, an electric motor, mechanical means operatively associated with said character cutting means and said electric motor for actuating the former by the latter including a clutch normally disposed with its elements out of engagement, electrically energized means for engaging said clutch elements and for effecting the character cutting phase of a character cutting cycle, including electrical circuits, a solenoid in said circuits, means for closing one circuit through the solenoid to actuate said solenoid, means for closing another circuit through said solenoid adapted to hold said solenoid energized, said last-named means being operative after said first-named circuit closing means is actuated and being adapted to maintain said solenoid energized upon release of said first closing means, a relay, means for energizing said relay to interrupt the circuits through said solenoid at a predetermined point in the character cutting cycle, and means for maintaining said relay energized at least until the character cutting cycle is completed.

17. In combination, a stencil cutting machine comprising character cutting means, an electric motor, mechanical means operatively associated with said character cutting means and said electric motor for actuating the former by the latter including a clutch normally disposed with its elements out of engagement, electrically energized means for engaging said clutch elements, and for effecting the character cutting phase of a character cutting cycle, including electrical circuits, a solenoid in said circuits, means for closing one circuit through the solenoid to actuate said solenoid, means for closing another circuit through said solenoid adapted to hold said solenoid energized, said last-named means being operative after said first-named circuit closing means is actuated and being adapted to maintain said solenoid energized upon release of said first closing means, a relay, means for energizing said relay to interrupt the circuits through said solenoid at a predetermined point in the character cutting cycle, means for maintaining said relay energized at least until the character cutting cycle is completed, and means for maintaining said relay energized and said solenoid circuits broken thereby after completion of the character cutting cycle until said means for closing one circuit is released whereby character cutting recycling is prevented in the event said means for closing one circuit is jammed closed or is held closed.

18. In combination, a stencil cutting machine comprising character cutting means, an electric motor, mechanical means operatively associated with said character cutting means and said electric motor for actuating the former by the latter including a clutch normally disposed with its elements out of engagement, electrically energized means for engaging said clutch elements, and for effecting the character cutting phase of a character cutting cycle, including electrical circuits, a solenoid in said circuits, means for closing one circuit through the solenoid to actuate said solenoid, means for closing another circuit through said solenoid adapted to hold said solenoid energized, said last-named means being operative after said first-named circuit closing means is actuated and being adapted to maintain said solenoid energized upon release of said first closing means, a relay, means for energizing said relay to interrupt the circuits through said solenoid at a predetermined point in the character cutting cycle, means for maintaining said relay energized at least until the character cutting cycle is completed, means for maintaining said relay energized and said solenoid circuits broken thereby after completion of the character cutting cycle until said means for closing one circuit is released whereby character cutting recycling is prevented in the event said means for closing one circuit is jammed closed or is held closed, and mechanical means for effecting the return to rest phase of a character cutting cycle.

19. In combination, a stencil cutting machine comprising character cutting means, an electric motor, mechanical means operatively associated with said character cutting means and said electric motor for actuating the former by the latter including a clutch normally disposed with its elements out of engagement, electrically energized means for engaging said clutch elements, and for effecting the character cutting phase of a character cutting cycle, including electrical circuits, a solenoid in said circuits, means for closing one circuit through the solenoid to actuate said solenoid, means for closing another circuit through said solenoid adapted to hold said solenoid energized, said last-named means being operative after said first-named circuit closing means is actuated and being adapted to maintain said solenoid energized upon release of said first closing means, a relay, means for energizing said relay to interrupt the circuits through said solenoid at a predetermined point in the character cutting cycle, means for maintaining said relay energized at least until the character cutting cycle is completed, means for maintaining said relay energized and said solenoid circuits broken thereby after completion of the character cutting cycle until said means for closing one circuit is released whereby character cutting recycling is prevented in the event said means for closing one circuit is jammed closed or is held closed, mechanical means for effecting the return to rest phase of a character cutting cycle, normally inactive mechanical means superposed on said first mentioned mechanical means for changing said character cutting cycle to a character spacing cycle without modification of the electrically energized means, and means for simultaneously rendering both mechanical means active.

20. In combination, a stencil cutting machine comprising character cutting means, an electric motor, mechanical means operatively associated with said character cutting means and said electric motor for actuating the former by the latter including a clutch normally disposed with its elements out of engagement, electrically energized means for engaging said clutch elements, and for effecting the character cutting phase of a character cutting cycle, including electrical circuits, a solenoid in said circuits, means for closing one circuit through the solenoid to actuate said solenoid, means for closing another circuit through said solenoid adapted to hold said solenoid energized, said last-named means being operative after said first-named circuit closing means is actuated and being adapted to maintain said solenoid energized upon release of said first closing means, a relay, means for energizing said relay to interrupt the circuits through said solenoid at a predetermined point in the character cutting cycle, means for maintaining said relay energized at least until the character cutting cycle is completed, means for maintaining said relay energized and said solenoid circuits broken thereby after completion of the character cutting cycle until said means for closing one circuit is released whereby character cutting recycling is prevented in the event said means for closing one circuit is jammed closed or is held closed, mechanical means for effecting the return to rest phase of a character cutting cycle, normally inactive mechanical means superposed on said first mentioned mechanical means for changing said character cutting cycle to a character spacing cycle without modification of the electrically energized means, means for simultaneously rendering both mechanical means active, and means for preventing engagement of the elements of the clutch in the event the character cutting means is not disposed in character cutting position.

21. A stencil cutting machine comprising, in combination, a base, a plurality of character cutting means mounted thereon for movement of selected character cutting means into and out of cutting position, means for locating a selected character cutting means in cutting position, actuatable means for effecting cutting action of a selected character cutting means including an oscillatable segmental shaft connected to said actuatable means, a continuously running motor, means for connecting said motor to said shaft, means for character spacing a stencil blank including means for effecting less oscillation of one segment of said segmental shaft than the other segment, and selective actuating means for actuating said motor and shaft connecting means to cut a character or for simultaneously actuating said motor and shaft connecting means and said means for effecting differential oscillation of said segmental shaft to character space a stencil blank.

22. A stencil cutting machine comprising, in combination, a base, character cutting means mounted thereon for movement into and out of cutting position, means for locating a selected character cutting means in cutting position, actuatable means for effecting cutting action of a selected character cutting means, a continuously running motor, means including a solenoid for actuating said actuatable means by said motor, an electrical circuit for said solenoid, means for closing the circuit through said solenoid to actuate said solenoid, a relay, and means for energizing said relay to interrupt the circuit through said solenoid at a predetermined point in the character cutting cycle.

23. A stencil cutting machine comprising, in combination, a base, character cutting means mounted thereon for movement into and out of cutting position, means for locating a selected character cutting means in cutting position, actuatable means for effecting cutting action of a selected character cutting means, a continuously running motor, means including a solenoid for actuating said actuatable means by said motor, an electrical circuit for said solenoid, means for closing the circuit through said solenoid to actuate said solenoid, a relay, means for energizing said relay to interrupt the circuit through said solenoid at a predetermined point in the character cutting cycle, and means for maintaining said relay energized at least until the character cutting cycle is completed.

24. A stencil cutting machine comprising, in combination, a base, character cutting means mounted thereon for movement into and out of cutting position, means for locating a selected character cutting means in cutting position, actuatable means for effecting cutting action of a selected character cutting means, a continuously running motor, means including a solenoid for actuating said actuatable means by said motor, an electrical circuit for said solenoid, means for closing the circuit through said solenoid to actuate said solenoid, a relay, means for energizing said relay to interrupt the circuit through said solenoid at a predetermined point in the character cutting cycle, means for maintaining said relay energized at least until the character cutting cycle is completed, and means for maintaining said relay energized and said solenoid circuit broken thereby after completion of the character cutting cycle until said means for closing the circuit is released whereby character cutting recycling is prevented in the event said means for closing said circuit is jammed closed or is held closed.

HERBERT W. HEMPEL.
WALTON C. MARSH.

REFERENCES CITED

The following references are of record in the file of this patent:

UNITED STATES PATENTS

| Number | Name | Date |
|---|---|---|
| 296,974 | Kimberly | Apr. 15, 1884 |
| 414,399 | Goodson | Nov. 5, 1889 |
| 955,116 | Duncan | Apr. 12, 1910 |
| 1,367,991 | Satterstrom | Feb. 8, 1921 |
| 1,557,754 | Chisholm | Oct. 20, 1925 |
| 2,133,201 | Krell | Oct. 11, 1938 |